US008120621B1

(12) United States Patent
Ogrinc et al.

(10) Patent No.: US 8,120,621 B1
(45) Date of Patent: Feb. 21, 2012

(54) METHOD AND SYSTEM OF MEASURING QUANTITATIVE CHANGES IN DISPLAY FRAME CONTENT FOR DYNAMICALLY CONTROLLING A DISPLAY REFRESH RATE

(75) Inventors: Michael A. Ogrinc, San Francisco, CA (US); Brett T. Hannigan, Philadelphia, PA (US); David Wyatt, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 903 days.

(21) Appl. No.: 11/957,374

(22) Filed: Dec. 14, 2007

(51) Int. Cl.
*G09G 5/00* (2006.01)

(52) U.S. Cl. .................. 345/629; 345/211; 375/240.13; 375/240.21

(58) Field of Classification Search ............. 375/240.13, 375/240.21; 345/211, 649
See application file for complete search history.

(56) References Cited

U.S. PATENT DOCUMENTS

| | | | |
|---|---|---|---|
| 6,222,881 B1 * | 4/2001 | Walker | 375/240.03 |
| 6,642,928 B1 * | 11/2003 | Deming et al. | 345/504 |
| 7,405,738 B2 * | 7/2008 | Mance et al. | 345/629 |
| 7,692,642 B2 * | 4/2010 | Wyatt | 345/211 |
| 2002/0015104 A1 * | 2/2002 | Itoh et al. | 348/459 |
| 2002/0027541 A1 | 3/2002 | Cairns et al. | |
| 2004/0252115 A1 | 12/2004 | Boireau | |
| 2005/0114894 A1 | 5/2005 | Hoerl | |
| 2006/0146056 A1 | 7/2006 | Wyatt | |
| 2006/0291558 A1 * | 12/2006 | Schreier et al. | 375/240.13 |
| 2007/0047660 A1 * | 3/2007 | Mitani et al. | 375/240.25 |
| 2007/0071404 A1 * | 3/2007 | Curtner et al. | 386/95 |
| 2007/0103387 A1 * | 5/2007 | Kondo et al. | 345/1.2 |
| 2007/0103585 A1 * | 5/2007 | Takeuchi et al. | 348/441 |
| 2007/0273787 A1 | 11/2007 | Ogino et al. | |
| 2008/0055318 A1 * | 3/2008 | Glen | 345/501 |
| 2008/0100598 A1 * | 5/2008 | Juenger | 345/204 |
| 2008/0152014 A1 * | 6/2008 | Schreier et al. | 375/240.21 |
| 2008/0239143 A1 | 10/2008 | Shin et al. | |
| 2009/0087016 A1 | 4/2009 | Berestov et al. | |

OTHER PUBLICATIONS

Office Action in U.S. Appl. No. 11/957,375, mailed Feb. 8, 2011.
Office Action, U.S. Appl. No. 11/957,379 dated Feb. 9, 2011.

* cited by examiner

*Primary Examiner* — M Good Johnson
(74) *Attorney, Agent, or Firm* — Patterson & Sheridan, LLP (57) ABSTRACT

A method and system are implemented to measure quantitative changes in display frame content for dynamically controlling a display refresh rate. Specifically, one embodiment of the present invention sets forth a method, which includes the steps of composing a first display frame from a first set of rendered image surfaces, composing a second display frame from a second set of rendered image surfaces, dividing the first display frame and the second display frame into a same number of frame regions. Also, for each of the frame regions, the method also includes the steps of calculating a first set of numerical codes and a second set of numerical codes representative of the content associated with the frame region in the first and second display frame, respectively; and determining an amount of changes in content between the first display frame and the second display frame based on the results of comparing the first set of numerical codes against the second set of numerical code.

20 Claims, 12 Drawing Sheets

METHOD AND SYSTEM OF MEASURING QUANTITATIVE CHANGES IN DISPLAY FRAME CONTENT FOR DYNAMICALLY CONTROLLING A DISPLAY REFRESH RATE

BACKGROUND OF THE INVENTION

1. Field of the Invention

The present invention generally relates to display systems capable of dynamically controlling a display refresh rate, and more particularly to a method and system of measuring quantitative changes in display frame content for dynamically controlling a display refresh rate.

2. Description of the Related Art

Unless otherwise indicated herein, the approaches described in this section are not prior art to the claims in this application and are not admitted to be prior art by inclusion in this section.

The refresh rate of a display device is the frequency at which display frames are repainted on a display device. Each refresh cycle of the display screen usually involves a series of processing steps, including accessing image data of multiple image surfaces rendered and stored in a frame buffer and combining the image surfaces to form a composite display frame. In parallel, the video signals corresponding to the composite display frame are also driven to the display device to update each pixel onto the screen of the display device. "Tearing" and other visual artifacts can occur when the asynchronous steps of rendering/compositing a frame and scanning out pixels occur out of sync. To avoid these artifacts, visual computing devices typically do "flipping" wherein composition of new frame buffer contents is done in off-screen frame-buffer memory separate from the frame-buffer currently being scanned from, and then synchronize the scanning to begin on the new frame-buffer as the scan-out of the current frame-buffer has reached it's end. As these processing steps are repeated at a high frequency, they can consume significant amount of power.

For situations in which dynamic graphics contents are to be rendered on the screen, e.g., interactive 3D games where the frame buffer contents are switched at a high frequency, also referred to as a "high flipping rate", a refresh rate of at least 60 Hz is usually necessary to completely convey the changing pixels without missing any visual content on the display screen. However, in other instances where the frame buffer updates are occurring at a low flipping rate, e.g., such as when the display screen represents an idle or quasi-static Windows Desktop image without any inputs or cursor movements by the user, it may be visually acceptable to reduce the refresh rate of the display screen to reduce the power consumption.

U.S. Application Publication No. 2006/0146056 describes one technical approach for dynamically controlling the refresh rate of a display device. This technical approach, also described as a "temporal entropy approach using intra-frame entropy detection", detects significant rendering in a display frame by assessing a bounded area affected by the content updates. However, this approach involves a number of testing steps in software and hardware to detect the bounded area which does not exclude interference of small display surfaces such as cursors. To carry out these steps in a timely manner, additional hardware complexity is required and thus driving up the cost of implementing and validating this technical approach. In addition, this prior art approach does not measure quantitative changes in the content of a display frame and evaluate how these quantitative changes evolve over a period of time.

What is needed in the art is thus a method and system that can cost effectively and efficiently evaluate quantitative changes in the content frame rate and also evaluate how these changes evolve over a period of time for dynamically adjusting a display refresh rate and address at least the problems set forth above.

SUMMARY OF THE INVENTION

The present application describes a method and system of measuring quantitative changes in display frame content for dynamically controlling a display refresh rate. Specifically, one embodiment of the present invention sets forth a method, which includes the steps of composing a first display frame from a first set of rendered image surfaces, composing a second display frame from a second set of rendered image surfaces, dividing the first display frame and the second display frame into a same number of frame regions. Also, for each of the frame regions, the method also includes the steps of calculating a first numerical code and a second numerical code representative of the content associated with the frame region in the first and second display frame, respectively; and determining an amount of changes in content between the first display frame and the second display frame based on the results of comparing the first numerical code against the second numerical code.

At least one advantage of the present invention disclosed herein is the ability to determine quantitative changes and mode of changes in content through multiple display frames for dynamically controlling the display refresh rate in a cost effective manner.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Throughout this disclosure, the term "display frame" means an image frame that includes one or more image surfaces to be presented on the screen of a display device. Illustrative image surfaces include, without limitation, (i) a base surface, such as a computer desktop background, (ii) an overlay surface, such as a window representing an application program process overlaying the desktop background, and (iii) a cursor surface, such as a blinking carat indicative of a position on the screen. Further, the term "display frame content" refers to graphics data, such as pixel colors or transparency values, for the image represented in a composed display frame. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Figure 1A:
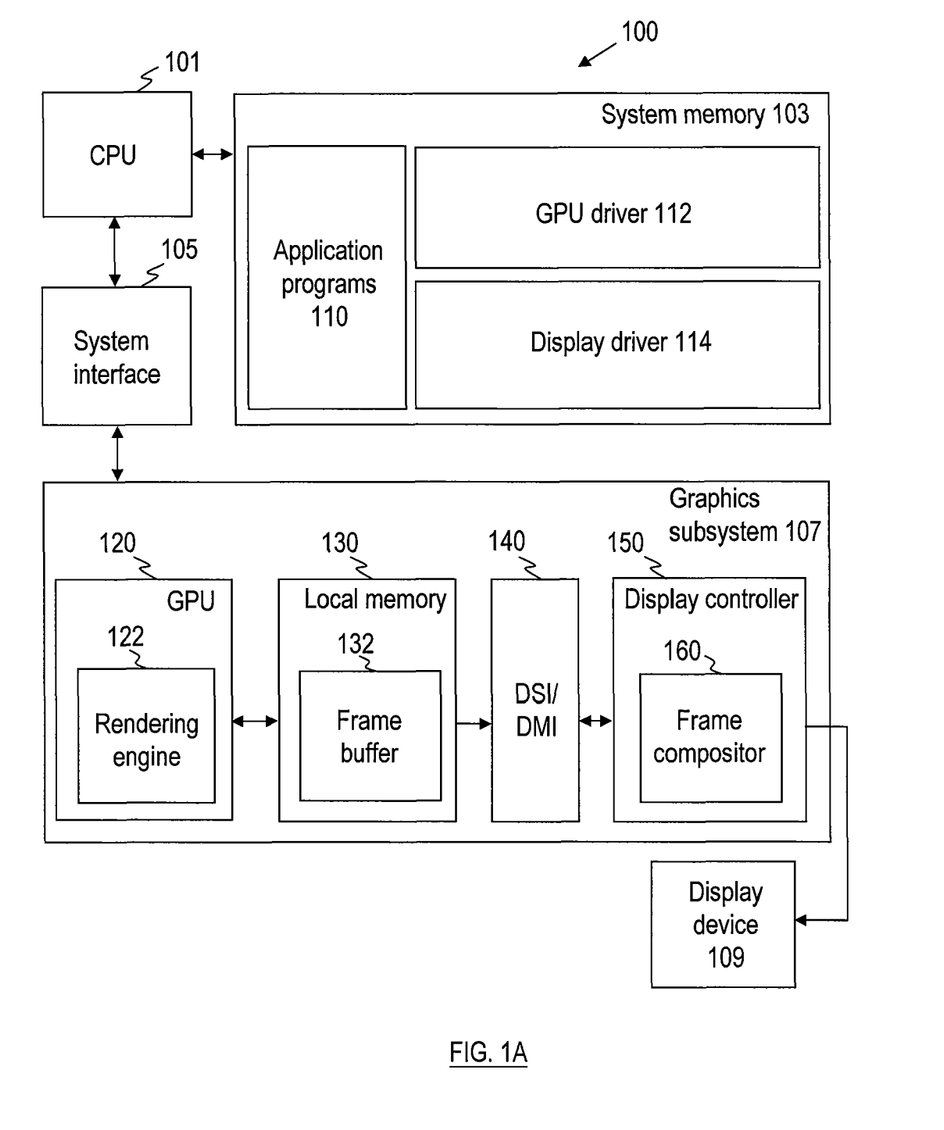
FIG. 1A is a conceptual diagram of a computer system configured to implement one or more aspects of the present invention.

FIG. 1A is a conceptual diagram of a computer system 100 configured to implement one or more aspects of the present invention. The computer system 100 includes a central processing unit (CPU) 101, a system memory 103, a system interface 105, a graphics subsystem 107, and a display device 109. The CPU 101 connects to the system memory 103 and the system interface 105. The CPU 101 executes programming instructions stored in the system memory 103, operates on data stored in the system memory 103, and communicates with the graphics subsystem 107 through the system interface 105. In alternate embodiments, the CPU 101, the graphics subsystem 107, the system interface 105, or any combination thereof, may be integrated into a single processing unit. Further, the functionality of the graphics subsystem 107 may be included in a chipset or in some other type of special purpose processing unit or co-processor. The system memory 103 typically includes dynamic random access memory (DRAM) configured to either connect directly to the CPU 101 (as shown) or alternately, via system interface 105. The graphics subsystem 107 executes instructions received from the CPU 101 and processes the instructions in order to render graphics data and images for display on the display device 109. The display device 109 is an output device capable of emitting a visual image corresponding to an input data signal.

The graphics subsystem 107 includes a graphics processing unit (GPU) 120, a local memory 130, a display software/monitor interface (DSI/DMI) 140, and a display controller 150. The GPU 120 executes instructions received from the CPU 101 to render graphics data into images and stores such images in the local memory 130. In particular, a rendering engine 122 inside the GPU 120 generates and stores multiple image surfaces in a frame buffer 132 within the local memory 130. The DSI/DMI 140 is a link interface through which the display controller 150 communicates with the frame buffer 132 and device drivers. The display controller 150 accesses the frame buffer 132 through the DSI/DMI 140 at a specified rate to retrieve and merge the various image surfaces to present on the display device 109 for display. A frame compositor 160 within the display controller 150 is responsible for merging the image surfaces, which will be discussed in further details hereinafter.

The system memory 103 may include multiple application programs 110, a GPU driver 112, and a display driver 114. One application program 110 may invoke one or more instances of high-level shader programs that are designed to operate on the rendering engine 122 within the GPU 120. These high-level shader programs may be translated into executable program objects by a compiler or assembler included in the GPU driver 112 or alternatively by an offline compiler or assembler operating either on the computer system 100 or other computer systems. The display driver 114 causes the display controller 150 to access multiple image surfaces from the frame buffer 132 and compose display frames for presentation on the display device 109. In order to control the refresh rate of the display device 109, in one implementation, the display driver 114 also determines a display mode for the display device 109 based on certain information tracked by the frame compositor 160, such as certain quantitative changes and modes of changes in content through multiple display frames.

Figure 1B:
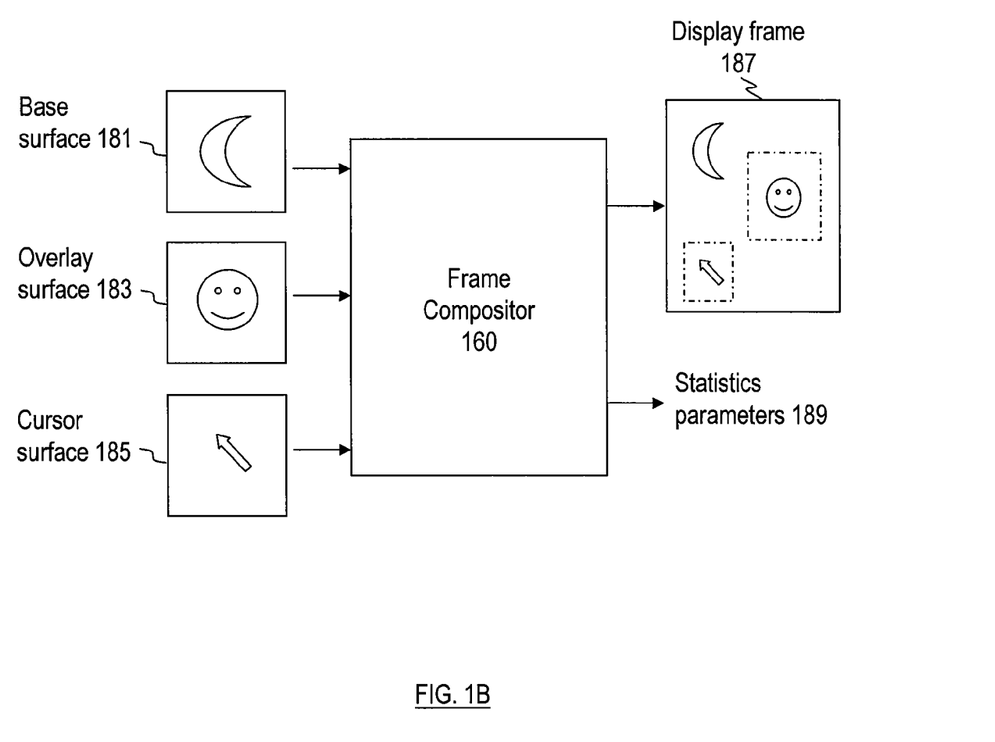
FIG. 1B is a block diagram of a frame compositor operable to measure quantitative changes in content through multiple display frames according to one or more aspects of the present invention.

FIG. 1B through FIG. 1E are block diagrams illustrating how the frame compositor 160 operates according to one embodiment of the present invention. Referring to FIG. 1B in conjunction with FIG. 1A, at each refresh cycle, the frame compositor 160 receives multiple image surface data stored in the frame buffer 132. In the illustrated embodiment, the multiple image surface data include a base surface 181, an overlay surface 183, and a cursor surface 185. The frame compositor 160 is configured to combine the image surfaces into a display frame 187 for presentation on the display device 109. For each newly generated display frame 187, the frame compositor 160 also determines whether any content in the display frame 187 has changed from the previous frame, tracks the amount of changes, and updates a number of statistics parameters 189 that describe how specified quantitative changes have occurred over a period of time.

Figure 1C:
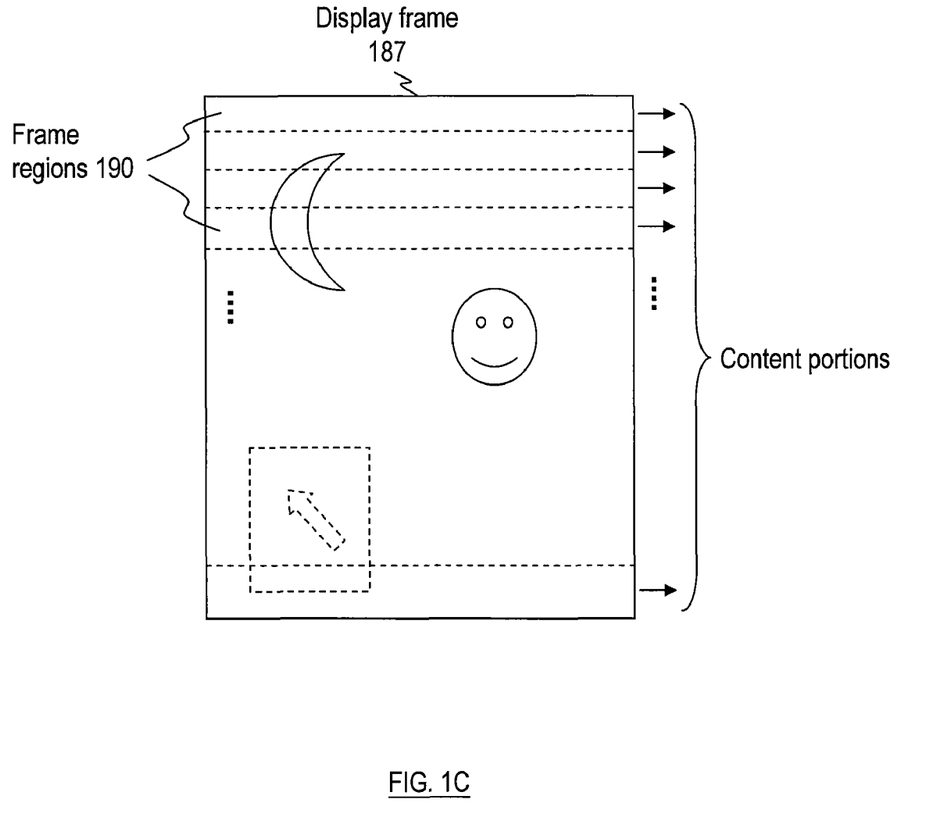
FIG. 1C is a conceptual diagram illustrating how quantitative changes in content are measured in a display frame according to one or more aspects of the present invention.

FIG. 1C illustrates how quantitative changes in content are measured in a display frame 187 according to one or more aspects of the invention. The area of the display frame 187 is divided into an array of individual frame regions 190, each covering a subset of the content in the display frame 187. In the illustrated embodiment, each of the frame regions 190 corresponds to a strip-shaped area encompassing a predetermined number of pixel rows and is laid out contiguously relative to one another. However, in alternate embodiments, each of the frame regions 190 may cover a differently-shaped area than the strip-shaped area. To estimate the amount of changes in the content of the display frame 187, every frame region 190 of the display frame 187 is separately evaluated to determine whether its associated content has changed since the previous display frame. A frame region 190 that is determined to have changed its associated content is also referred to as a "changed frame region" hereinafter. Then, these changed frame regions are counted to generate an aggregated number representative of the amount of change in the content of the display frame 187. In certain instances, however, simple cursor movements together with the content of the other image surfaces that compose the display frame 187 remaining unchanged may cause a significant number of frame regions 190 to change. Thus, according to an embodiment shown in FIG. 1D, it is preferable to measure the change in content in a partially composed display frame 188 that includes the base surface 181 and overlay surface 183. By excluding the cursor surface 185, the results of the detected number of changed frame regions more accurately reflects the amount of changes in content.

Figure 1D:
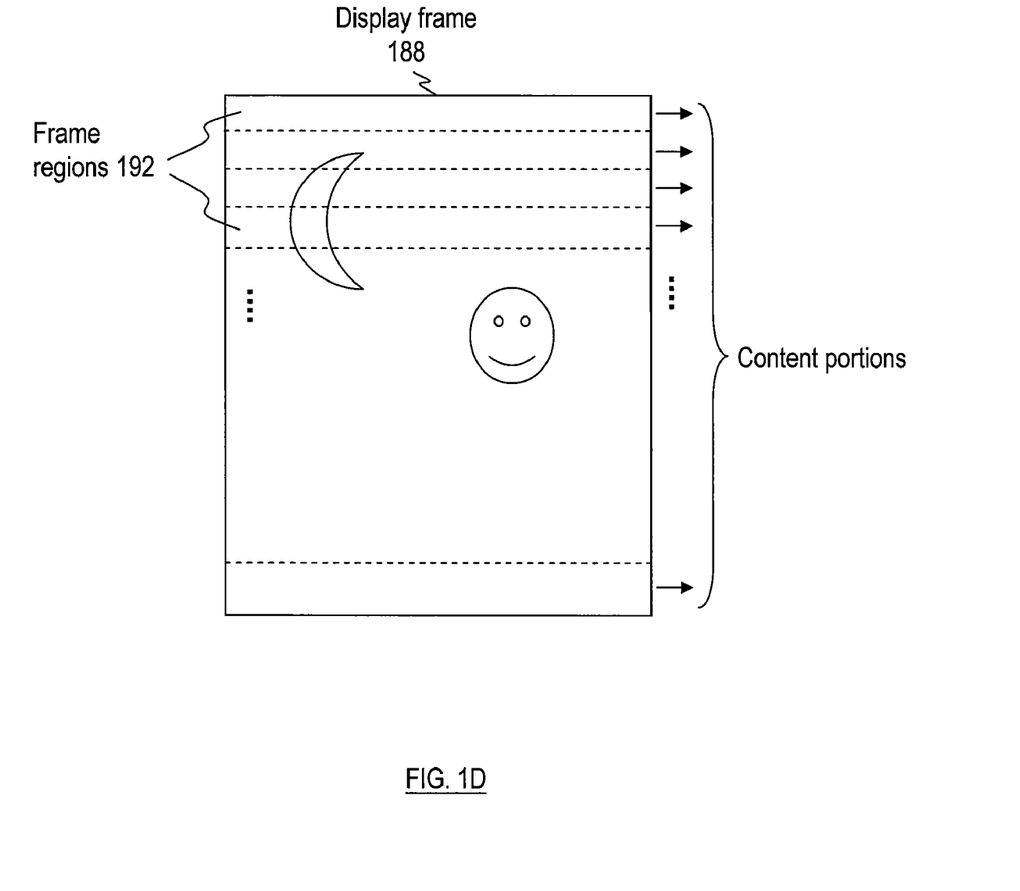
FIG. 1D is a conceptual diagram illustrating how quantitative changes in content are measured in a partially composed display frame according to one or more aspects of the present invention.
Figure 1E:
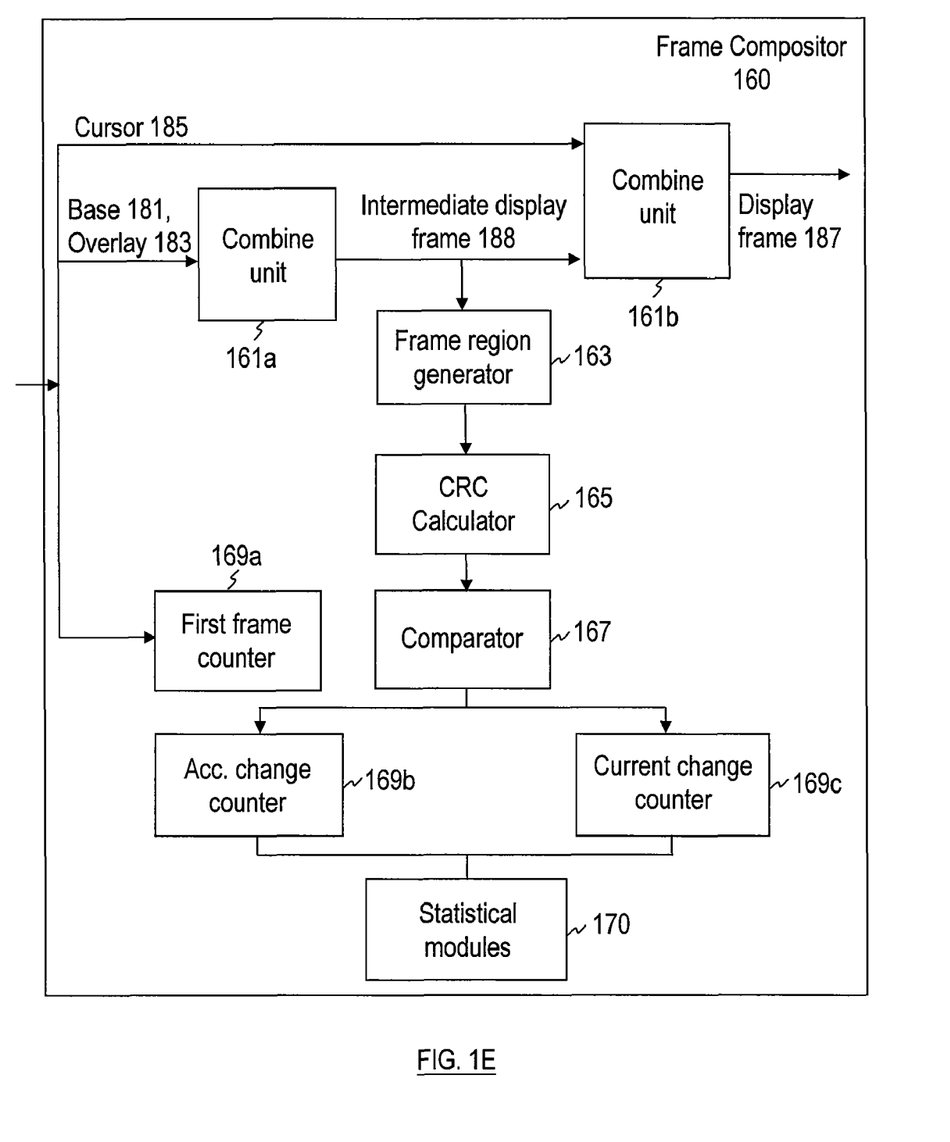
FIG. 1E is a conceptual diagram of a frame compositor according to one embodiment of the present invention.

FIG. 1E illustrates one implementation of the frame compositor 160 of FIG. 1A suitable for tracking quantitative changes in content through display frames, according to one embodiment of the invention. Specifically, in one implementation, the frame compositor 160 includes two combine units 161a and 161b, a frame region generator 163, a cyclic redundancy check ("CRC") calculator 165, a comparator 167, a first frame counter 169a, an accumulative change counter 169b, a current change counter 169c, and a plurality of statistical modules 170. The frame compositor 160 causes the first frame counter 169a to be incremented by one as it receives multiple image surface data, such as a base surface 181, an overlay surface 183, and a cursor surface 185. The first combine unit 161a composes an intermediate display frame, such as the intermediate display frame 188 of FIG. 1D with the base surface 181 and overlay surface 183. The second combine unit 161b composes a complete display frame, such as the display frame 187 shown in FIG. 1C from the intermediate display frame 188 and the remaining image surface, such as the cursor surface 185 shown in FIG. 1B. The intermediate display frame 188 is divided into an array of frame regions 192 through the frame region generator 163. The frame region generator 163 sets certain parameters for the frame regions 192, such as the size of each frame region 192 and a total number of the frame regions 192 in the intermediate display frame 188. As discussed above, in one implementation, the array of frame regions 192 can include a series of parallel horizontal strips laid out in a contiguous manner, each of which including a predetermined number of pixel rows.

The content associated with every frame region 192 in the intermediate display frame 188 is then put through the CRC calculator 165, which applies a CRC algorithm to compute one current CRC value associated with such content. It is worth noting that although the CRC method is discussed herein, a person with ordinary skills in the art will recognize that other methods for generating a numerical code representative of the content portion of the frame region 192 can be used. For each given frame region 192, the comparator 167 then compares the current CRC value against a previously calculated CRC value associated with the same frame region 192 in the previous intermediate display frame 188. If the current CRC value differs from the previous CRC value, the content portion associated with this frame region 192 is deemed to have changed between the current and the previous intermediate display frame 188. All the changed frame regions 192 that are identified by this comparison of CRC values are counted, and the resulting value is updated in the current change counter 169c that thereby measures a current amount of changes in content for each of the intermediate display frame 188 currently generated. To track an accumulative amount of changes in content over a period of time, the accumulative change counter 169b records the number of all the changed frame regions 192 of all the intermediate display frames 188 that the combine unit 161a has generated thus far. Based on the information stored in the counter 169c, the statistical modules 170 are configured to compute and capture certain statistics parameters 189 associated with the quantitative changes in content, and also ascertain certain patterns of changes in content.

Figure 2A:
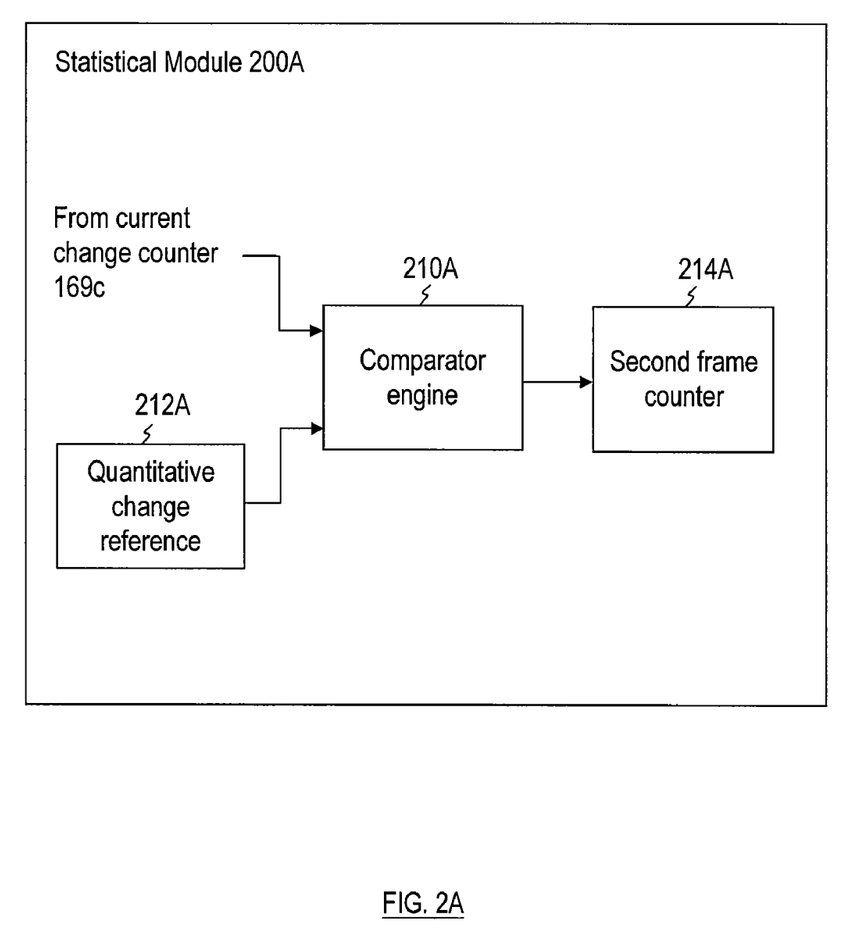
FIG. 2A is a conceptual diagram of a statistical module configured to track a number of display frames with a specified pattern of quantitative changes in content according to one embodiment of the present invention.
Figure 2B:
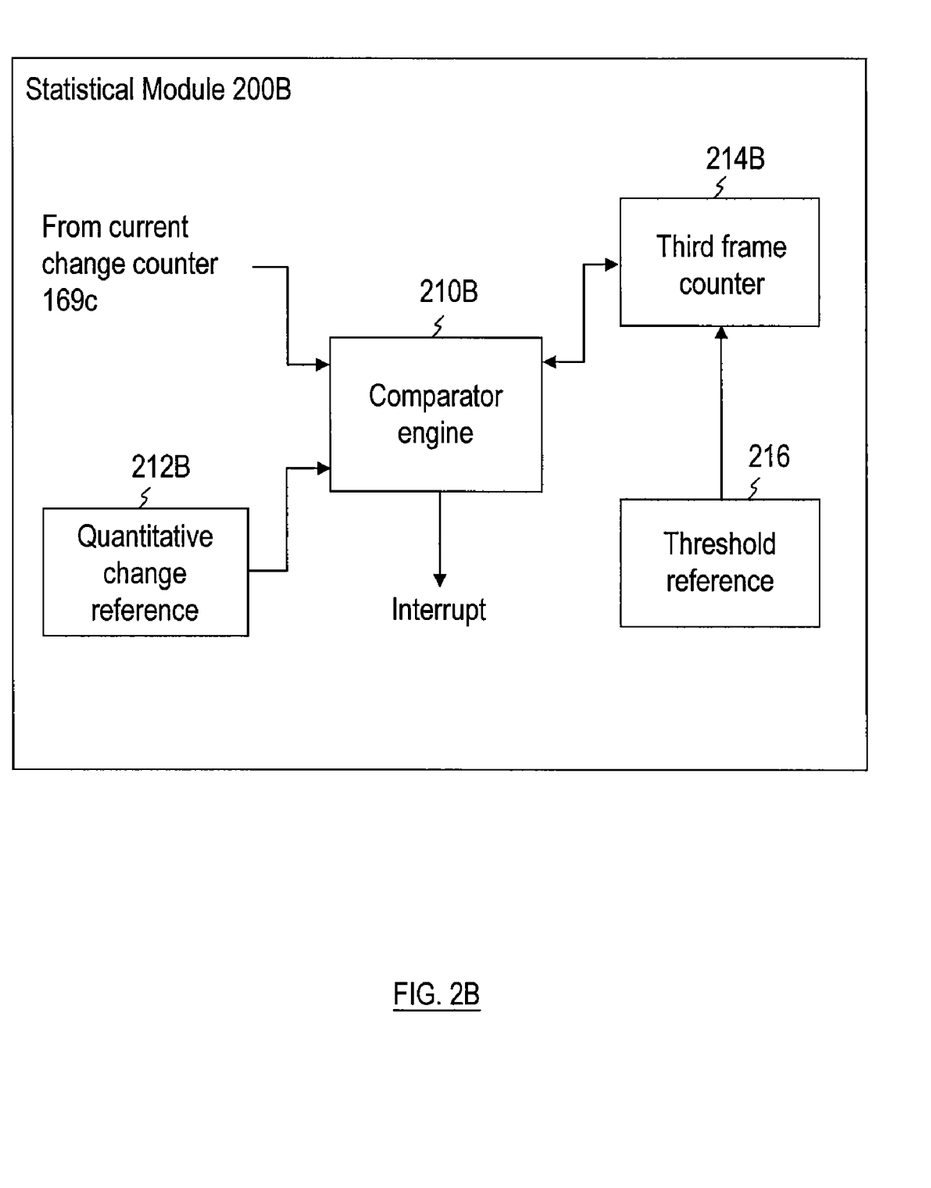
FIG. 2B is a conceptual diagram of a modified statistical module configured to detect a specified occurrence of one content change pattern in display frames according to an embodiment of the present invention.
Figure 2C:
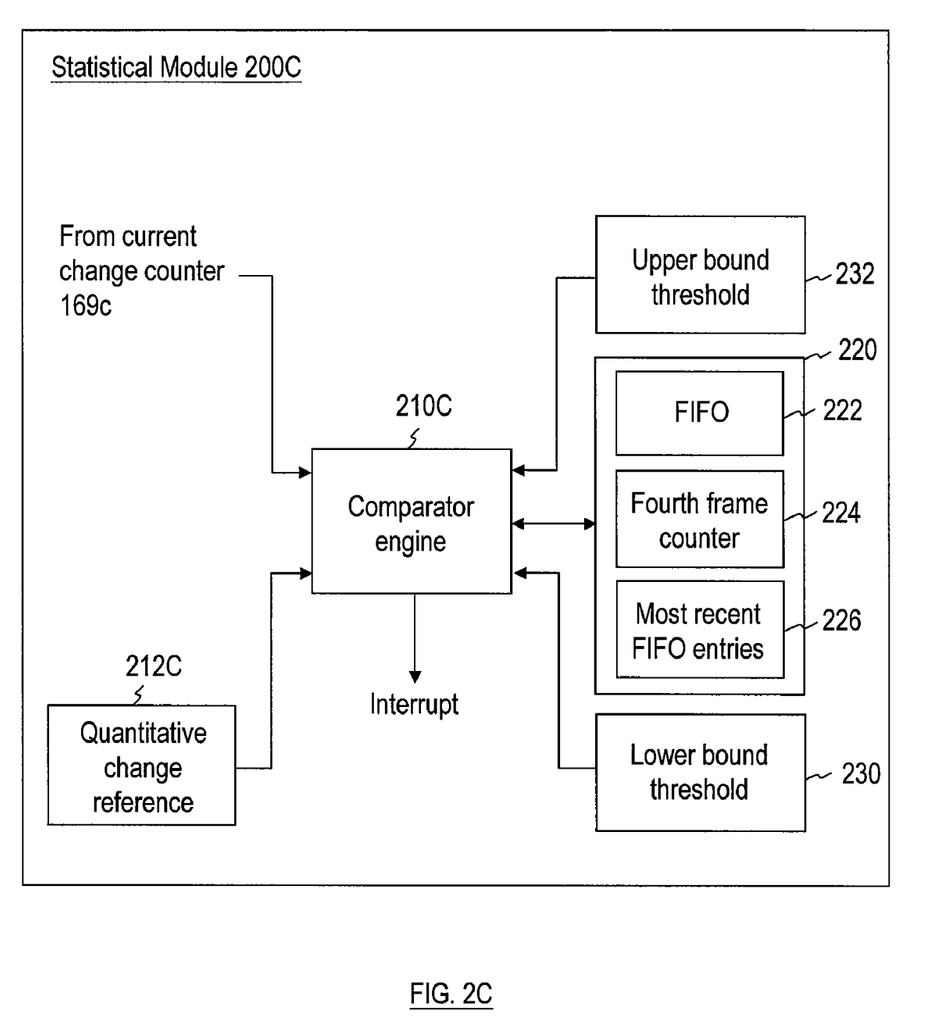
FIG. 2C is a conceptual diagram of another statistical module configured to detect other specified occurrences of content change patterns in display frames according to yet another embodiment of the present invention.
Figure 2D:
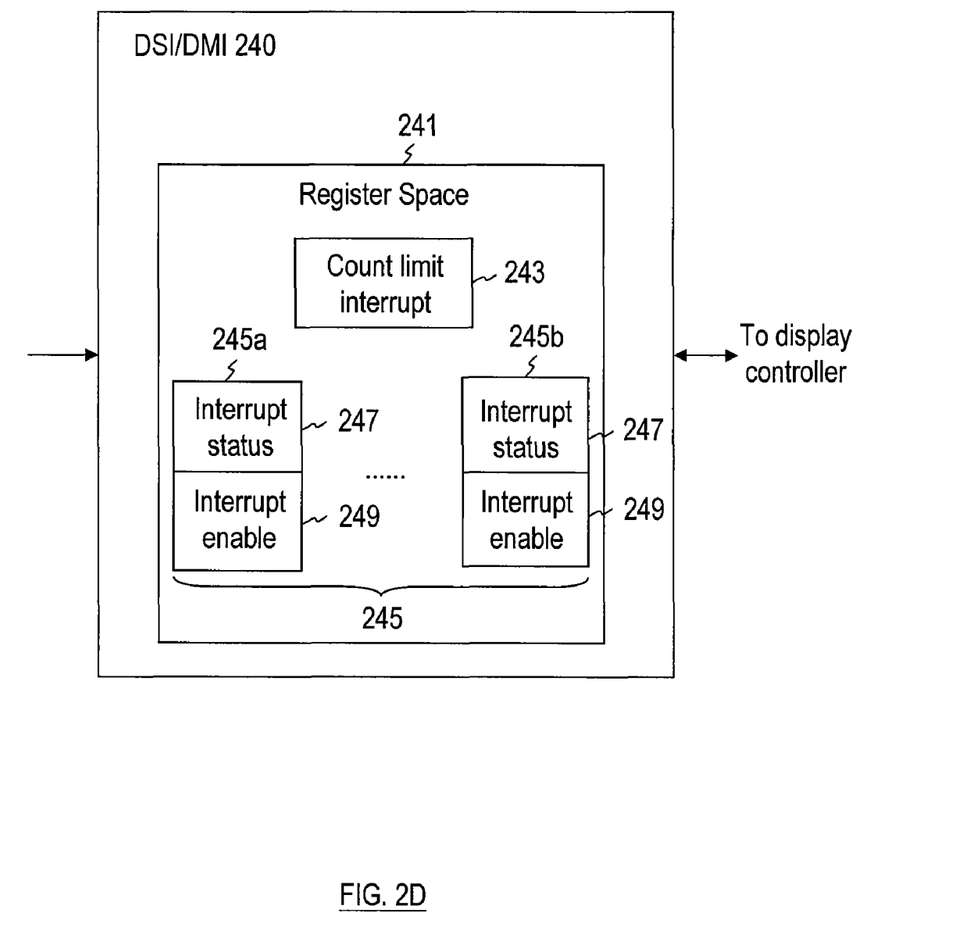
FIG. 2D is a conceptual diagram of a DSI/DMI according to one embodiment of the present invention.
Figure 3A:
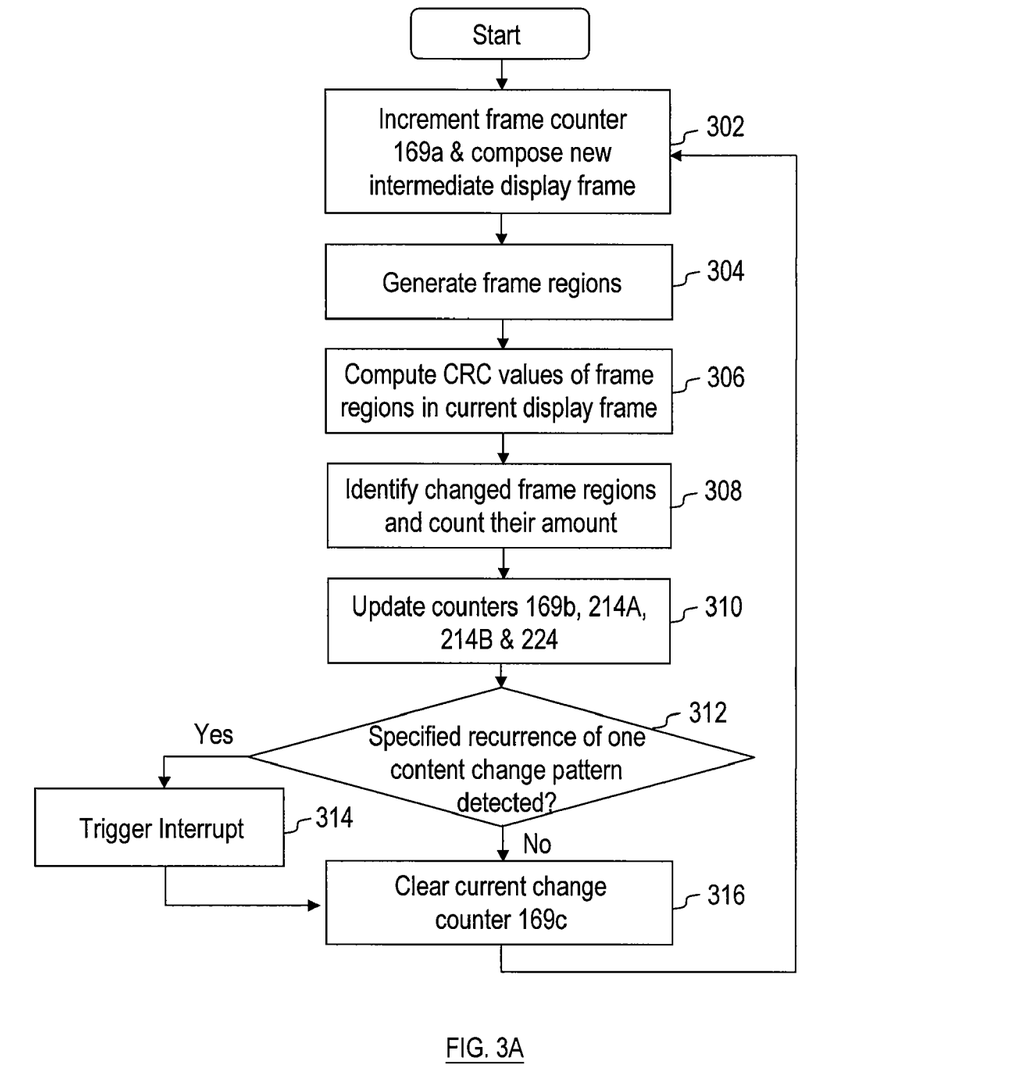
FIG. 3A is a flowchart showing the method steps for measuring quantitative changes in content through a frame compositor, according to one embodiment of the present invention.
Figure 3B:
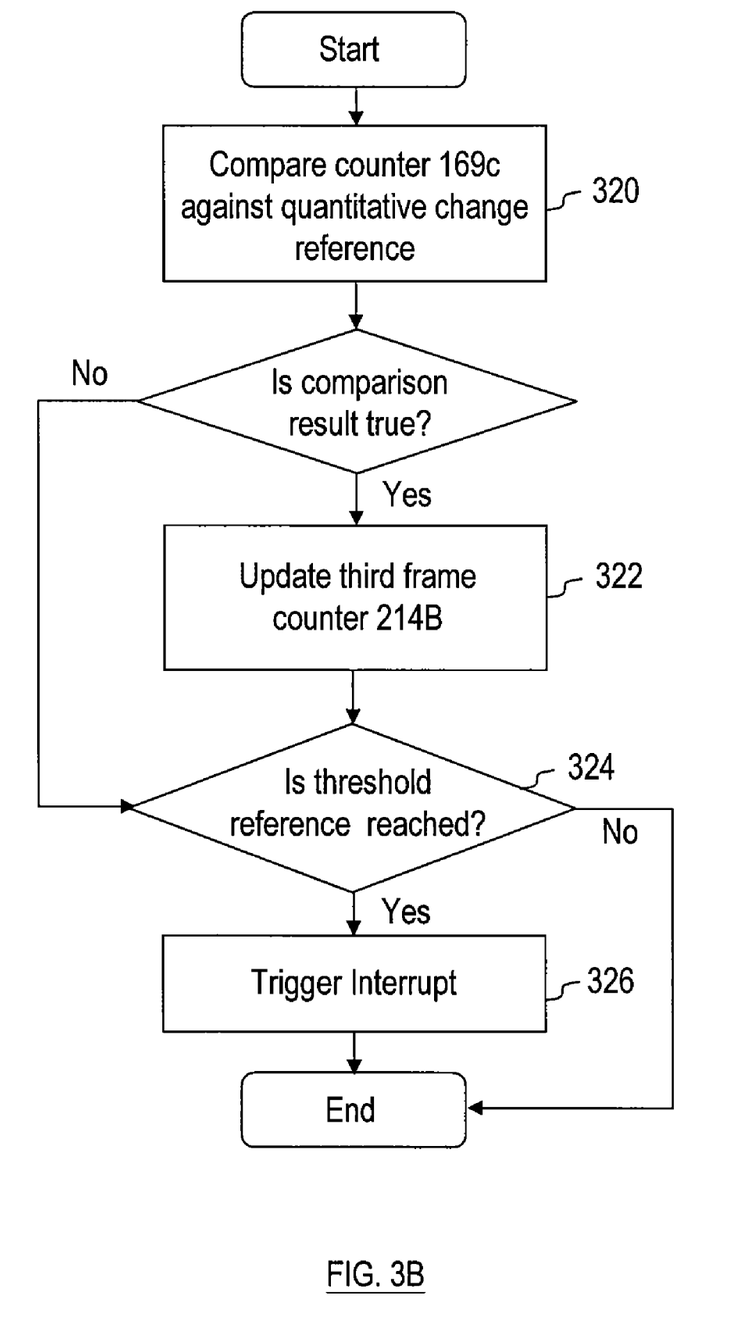
FIG. 3B is a flowchart showing the method steps for detecting a specified occurrence of one content change pattern in display frames according to an embodiment of the present invention.
Figure 3C:
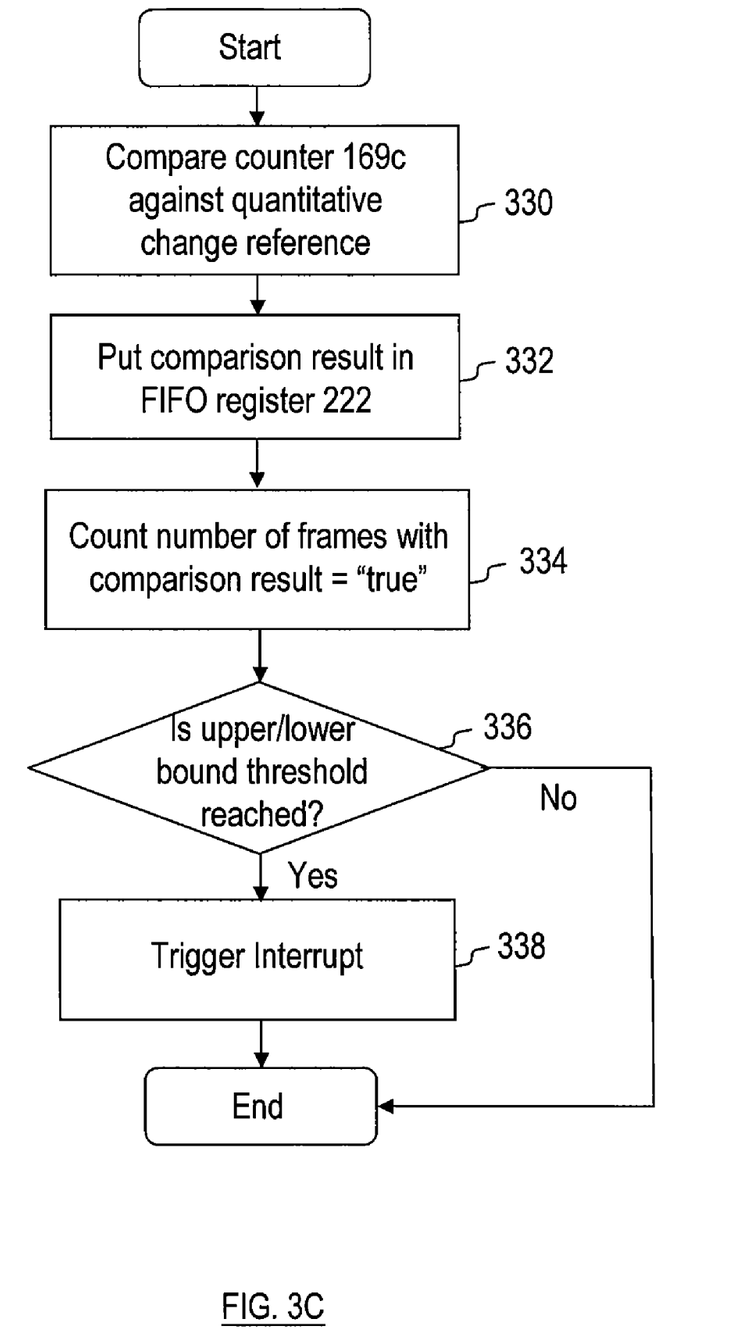
FIG. 3C is a flowchart showing the method steps for detecting other specified occurrences of content change patterns in display frames according to another embodiment of the present invention.

FIG. 2A through FIG. 2C are block diagrams illustrating some embodiments of the statistical modules 170 shown in FIG. 1D according to one or more aspects of the invention. Referring to FIG. 2A in conjunction with FIG. 1D, in one implementation, a statistical module 200A can include a comparator engine 210A, a register storing a programmable quantitative change reference 212A, and a second frame counter 214A. The quantitative change reference 212A defines a reference amount of changed frame regions per intermediate display frame 188. Once the counter 169c is updated in the manner described above, the comparator engine 210A compares the measured number of changed frame regions against the quantitative change reference 212A. The comparator engine 210A may look for conditions such as: 1) the measured number of changed frame regions in the counter 169c is greater than the quantitative change reference 212A, or 2) the measured number of changed frame regions 192 in the counter 169c is less than the quantitative change reference 212A. Based on the result of the comparison operation, the second frame counter 214A then is updated to track the number of the intermediate display frames 188 that meet either of the conditions described above. To illustrate, suppose that the value of 20 changed frame regions is set as the quantitative change reference 212A, and the comparator engine 210A looks for at least 20 changed frame regions in the intermediate display frame 188. Every time the number of changed frame regions stored in the counter 169c for the current intermediate display frame 188 exceeds 20, the second frame counter 214A operating as described above will increment by one. Moreover, in one implementation, certain statistics information associated a particular pattern of frame region changes is also tracked for the intermediate display frames 188. Such a pattern is referred to as a "content change pattern" and is provided to further quantitatively describe how content changes occur over a period of time. To decide when an adjustment of the display refresh rate is needed, in one implementation, the occurrences of these content change patterns can be considered.

FIG. 2B illustrates a statistical module 200B according to another embodiment of the invention, configured to detect a specific occurrence of one content change pattern from multiple display frames. In conjunction with FIG. 1D, the statistical module 200B includes a comparator engine 210B, a register storing a programmable quantitative change reference 212B, a third frame counter 214B, and a register storing a programmable threshold reference 216. Similar to the statistical module 200A shown in FIG. 2A, after the counter 169c is updated, the comparator engine 210B shown in FIG. 2B compares the value stored in the counter 169c against the quantitative change reference 212B. The comparator engine 210B may likewise look for conditions such as: 1) the measured number of changed frame regions in the counter 169c is greater than the quantitative change reference 212B, or 2) the measured number of changed frame regions in the counter 169c is less than the quantitative change reference 212B.

However, unlike the previous second frame counter 214A that merely counts a number of the intermediate display frames 188 that meets either of the specified conditions, the third frame counter 214B is now configured to track when a number of the intermediate display frames 188 that meets the specified condition can reach a specified threshold as defined by the threshold reference 216. In an embodiment of the present invention, the programmed threshold reference 216 is initially set in the third frame counter 214B. If the condition of changes in content tested by the comparator engine 210B for a current intermediate display frame 188 is met, the third frame counter 214B is decremented by one; otherwise, the third frame counter 214B is held unchanged. After the updated third frame counter 214B reaches the value 0, an interrupt signal is issued through the DSI/DMI 140 shown in FIG. 1A to signal that a specified occurrence of one content change pattern has been detected. The operating system and/or display driver then can access to the content of the counters 169a, 169b, 214A and 214B, to decide whether an action is required to adjust the refresh rate.

To illustrate, suppose that the statistical module 200B is configured to detect an occurrence of significant changes in content, and suppose further that 20 changed frame regions constitute significant changes in content and is set as the change reference 212B. Then the testing conditions include: looking for 4 current display frames each having more than 20 changed frame regions from a previous display frame. In other words, the threshold reference 216 is programmed to be 4. So, the value 4 is initially set in the third frame counter 214B, and according to the operations described above, is subsequently decrement by one at each occurrence of identifying a display frame having more than 20 changed frame regions from a previous display frame. When the counter 214B reaches 0, an interrupt signal is issued to indicate that the sought content change pattern has occurred, and adequate actions may be required to raise the refresh rate if the display mode was in a low refresh rate mode. In the same manner, by modifying the testing condition of changes in content and the threshold reference, another statistical module 200B may be configured to detect display situations that are suitable for switching from a high refresh mode into a low refresh rate mode. With multiple statistical modules 200B configured to detect various occurrences of content change patterns, the operating system and display driver thus can be notified when certain programmed content change patterns in display frame contents are detected, and then they have access to information that quantitatively describe these changes for dynamically controlling an adequate display refresh rate.

FIG. 2C illustrates an additional statistical module 200C according to yet another embodiment of the present invention, configured to detect other occurrences of content change patterns in a panel of elapsed intermediate display frames 188. In conjunction with FIG. 1D, the statistical module 200C includes a comparator engine 210C, a register storing a programmable quantitative change reference 212C, a register storing a lower bound threshold 230, a register storing an upper bound threshold 232, and a set of registers 220 including a first-in-first-out (FIFO) register 222, a fourth frame counter 224, and a register 226 storing a number of most recent entries in the FIFO register 222.

Similarly, for each intermediate display frame 188, the comparator engine 210C applies a comparison operation on the measured number of changed frame regions in counter 169c to determine whether it meets a specified condition of changes in content. The conditions of changes tested by the comparator engine 210C are similar to those described previously. The FIFO register 222 has a programmable depth that is used to track the results of the comparison operation applied on a panel of past intermediate display frames 188. In other words, the bit result of each comparison between the value stored in the counter 169c and the quantitative change reference 212C, which may be "true" or the Boolean value "1" if the testing condition of content changes is met and "false" or the Boolean value "0" if the testing condition of content changes is not met, is pushed in the FIFO register 222. To allow convenient access of the information gathered in the FIFO register 222, the register 226 duplicates a specified number of most recent entries in the FIFO register 222.

To detect a specific occurrence of one content change pattern, the number of comparison results equal to "true" or 1 in the FIFO register 222 is tracked in the fourth frame counter 224 which, after each update, is compared against the lower bound threshold 230 and upper bound threshold 232 that represent programmed occurrence indicators of one content change pattern. To further clarify the operation of the fourth frame counter 224, suppose a bit pushed in the FIFO register 222 is 1, and a bit popped out of the FIFO register 222 is 0. Then, the fourth frame counter 224 will accordingly be incremented by 1. If the bit pushed in and the bit popped out of the FIFO register 222 have the same value, then the fourth frame counter 224 is held unchanged; and if the bit pushed in the FIFO register 222 is 0, and the bit popped out of the FIFO register 222 is 1, then the fourth frame counter 224 is decremented by one. Once it has been updated, the fourth frame counter 224 is respectively compared with the lower bound threshold 230 and the upper bound threshold 232. In case the value of the fourth frame counter 224 is less than the lower bound threshold 230 or greater than the upper bound threshold 232, an interrupt signal is triggered to notify that the programmed occurrence of one content change pattern has been detected.

As has been described above, quantitative changes in display frame content thus can be tracked by using various counters 169a, 169b, 214A, 214B and 224. These counters can be reset simultaneously by the display driver and/or operating system. In addition, the detection of certain occurrences of content change patterns can be signaled to the operating system and/or display driver by issuing diverse interrupt signals. To identify these interrupt signals, a number of interrupt registers are defined in the DSI/DMI 140 as detailed hereafter.

In conjunction with FIG. 1D and FIGS. 2A-2C, FIG. 2D is a block diagram showing a DSI/DMI 240 configured with multiple interrupt control modes according to an embodiment of the invention. The DSI/DMI 240 has a register space 241 that includes a register defining a count limit interrupt 243, and multiple sets of interrupt registers 245 that define interrupt modes associated with the statistical modules 200B and 200C. The count limit interrupt 243 is set whenever the most significant bit of any one of the counters 169a, 169b, and 214A is set, which signals that one or more of these counters may reach its count limit. The operating system and/or the display driver then read these counters to take appropriate actions. Each set of interrupt register 245 is associated with one statistical module configurable to detect a specified occurrence of one content change pattern: for example, the set of interrupt registers 245a is associated with the statistical module 200B, and the set of interrupt registers 245b is associated with the statistical module 200C. Each set of interrupt registers 245 includes a first register that defines an interrupt status 247, and a second register that defines an interrupt enable bit 249. The interrupt status 247 is set whenever an interrupt signal is generated from the corresponding statistical module. The interrupt enable bit 249 specifies whether the corresponding statistical module is used for detecting a specified occurrence of one content change pattern.

In conjunction with FIG. 1A, FIG. 1D and FIGS. 2A-2C, FIG. 3A is a flowchart showing the method steps of measuring quantitative changes in content over a period of time by the frame compositor 160, according to one embodiment of the present invention. In initial step 302, the combine unit 161a within the frame compositor 160 composes an intermediate display frame 188 from one or more image surface data from the frame buffer 132, and causes the first frame counter 169a to increment by one. In step 304, the intermediate display frame 188 then is divided into frame regions 190 via the frame generator 163. In step 306, based on the frame regions 190 defined in the intermediate display frame 188, the CRC calculator 165 computes one current CRC value associated with the content portion of each frame region 190. In step 308, for each given frame region 190, the comparator 167 then compares the current CRC value against the previously calculated CRC value associated with the same frame region in the previous intermediate display frame 188 to identify which ones are changed frame regions, the number of which is counted in counter 169c. In step 310, based on the detected number of changed frame regions, a number of counters, such as counters 169b, 214A, 214B and 224 are updated. In step 312, the statistical modules 200B and 200C then operate to detect various specified occurrences of content change patterns in elapsed intermediate display frames 188. If a specified occurrence of one content change pattern is detected, the DSI/DMI 140 issues an interrupt signal in step 314. Subsequently, the counter 169c is reset in step 316, so that the frame compositor 160 can restart the aforementioned processing cycle for a next intermediate display frame 188.

In conjunction with FIG. 1D, FIG. 2B and FIG. 2C, FIG. 3B is a flowchart showing the method steps of detecting a specified occurrence of one content change pattern over a period of time by the statistical module 200B, according to one embodiment of the present invention. The statistical module 200B starts to operate upon each update of the counter 169c. More specifically, in initial step 320, the comparator engine 210B applies a comparison operation on the updated value in counter 169c to determine whether it meets a specified condition of changes in content. Various comparison operations have been described above. If the condition of changes in content is met, the third frame counter 214B is updated in step 322 to track the number of intermediate display frames 188 that have met the specified condition of changes. In step 324, the value of the counter 214B then is compared to determine whether it has reached the threshold reference 216. If the value of the counter 214B has reached the threshold reference 216, an interrupt signal is eventually issued through the DSI/DMI 240, which has the corresponding interrupt status 247 set.

In conjunction with FIG. 1D and FIGS. 2A-2C, FIG. 3C is a flowchart showing the method steps of detecting other specified occurrences of content change patterns over a period of time by the statistical module 200C, according to yet another embodiment of the present invention. Similar to the statistical module 200B, the statistical module 200C starts to operate upon each update of the counter 169c. More specifically, in initial step 330, the comparator engine 210C applies a comparison operation on the updated value in counter 169c to determine whether it meets a specified condition of changes in content. In step 332, the result of the comparison operation is put in the FIFO register 222. In step 334, the fourth frame counter 224 then is updated to track the number of comparison results that are equal to "true" or "1" in the FIFO register 222. A method of using the counter 224 to track comparison results contained in FIFO register 222 has been described previously. In step 336, the updated value of the counter 224 then is compared to determine whether it has reached any of the lower bound threshold 230 or the upper bound threshold 232. If either the lower bound threshold 230 or the upper bound threshold 232 is reached, an interrupt signal is eventually issued in step 338 to signal the detection of a specified occurrence of one content change pattern.

As has been described above, the method and system described herein thus is able to provide useful information that evaluate quantitative changes in content, and also detect specified occurrences of content change patterns in display frame content, so that adequate actions can be taken for dynamically adjusting the refresh rate in a cost effective matter.

The above description illustrates various embodiments of the present invention along with examples of how aspects of the present invention may be implemented. The above examples, embodiments, instruction semantics, and drawings should not be deemed to be the only embodiments, and are presented to illustrate the flexibility and advantages of the present invention as defined by the following claims.

We claim:

1. A method for measuring quantitative changes in the content of a display frame, the method comprising:
   composing a first display frame from a first set of rendered image surfaces;
   composing a second display frame from a second set of rendered image surfaces;
   dividing the first display frame and the second display frame into a same number of frame regions;
   for each of the frame regions, calculating a first set of numerical codes using the content associated with the frame region in the first display frame and a second set of numerical codes using the content associated with the frame region in the second display frame; and
   determining an amount of changes in content between the first display frame and the second display frame based on the results of comparing the first set of numerical codes against the second set of numerical codes.

2. The method of claim 1, wherein each of the first set of rendered image surfaces and the second set of rendered image surfaces including at least a base surface and optionally an overlay surface and exclude a cursor surface.

3. The method of claim 1, wherein each of the frame regions covers a strip-shaped area of the content.

4. The method of claim 1, wherein the steps of calculating the first set of numerical codes and the second set of numerical codes further comprising applying a cyclic redundancy check computation to the content associated within each of the frame regions for the first display frame and the second display frame, respectively.

5. The method of claim 1, further comprising tracking the amount of changes in content that has occurred between the first display frame and the second display frame with a second counter by aggregating a number of occurrences in which the results indicate a difference between the first set of numerical codes and the second set of numerical codes.

6. A method of dynamically controlling a display refresh rate, comprising repeating the method steps of claim 1 over a period of time.

7. The method of claim 6, further comprising tracking a number of composed display frames over the period of time.

8. The method of claim 6, further comprising tracking an accumulative amount of changes in content that has occurred within the period of time.

9. The method of claim 6, further comprising tracking a number of display frames in which the amount of changes in content meets a condition associated with a quantitative change reference.

10. The method of claim 9, further comprising triggering the issuance of an interrupt signal when the number of display frames meets a condition associated with a threshold reference.

11. A computing device for measuring quantitative changes in the content of a display frame, the computing device comprising:
    a memory system for storing at least a first set of rendered image surfaces and a second set of rendered image surfaces; and
    a processing unit configured to perform a set of operations comprising:
        composing a first display frame from the first set of rendered image surfaces;
        composing a second display frame from the second set of rendered image surfaces;
        dividing the first display frame and the second display frame into a same number of frame regions;
        for each of the frame regions, calculating a first set of numerical codes using the content associated with the frame region in the first display frame and a second set of numerical codes using the content associated with the frame region in the second display frame; and
        determining an amount of changes in content between the first display frame and the second display frame based on the results of comparing the first set of numerical codes against the second set of numerical codes.

12. The computing device of claim 11, wherein each of the first set of rendered image surfaces and the second set of rendered image surfaces includes at least a base surface and overlay surface and exclude a cursor surface.

13. The computing device of claim 11, wherein each of the frame regions covers a strip-shaped area of the content.

14. The computing device of claim 11, wherein the processing unit is configured to compute the first and second numerical code by applying a cyclic redundancy check computation to the content associated with the frame region for the first display frame and the second display frame, respectively.

15. The computing device of claim 11, wherein the processing unit is configured to track the amount of changes in content that has occurred between the first display frame and the second display frame by aggregating a number of occurrences in which the results indicate a difference between the first numerical code and the second numerical code.

16. The computing device of claim 11, wherein the processing unit is further configured to repeat the set of operations over a period of time to dynamically control a display refresh rate.

17. The computing device of claim 16, wherein the processing unit is further configured to track a number of composed display frames over the period of time.

18. The computing device of claim 16, wherein the processing unit is further configured to track an accumulative amount of changes in content that has occurred within the period of time.

19. The computing device of claim 16, wherein the processing unit is further configured to track a number of display frames in which the amount of changes in content meets a condition associated with a quantitative change reference.

20. The computing device of claim 19, wherein the processing unit is further configured to trigger the issuance of an interrupt signal when the number of display frames meets a condition associated with a threshold reference.

* * * * *